Dec. 28, 1926.  
W. L. FURMAN  
1,612,504  
SIGNALING DEVICE FOR GIVING WARNING OF DEFECTIVE ELECTRIC APPARATUS  
Filed Jan. 13, 1923  
2 Sheets-Sheet 1
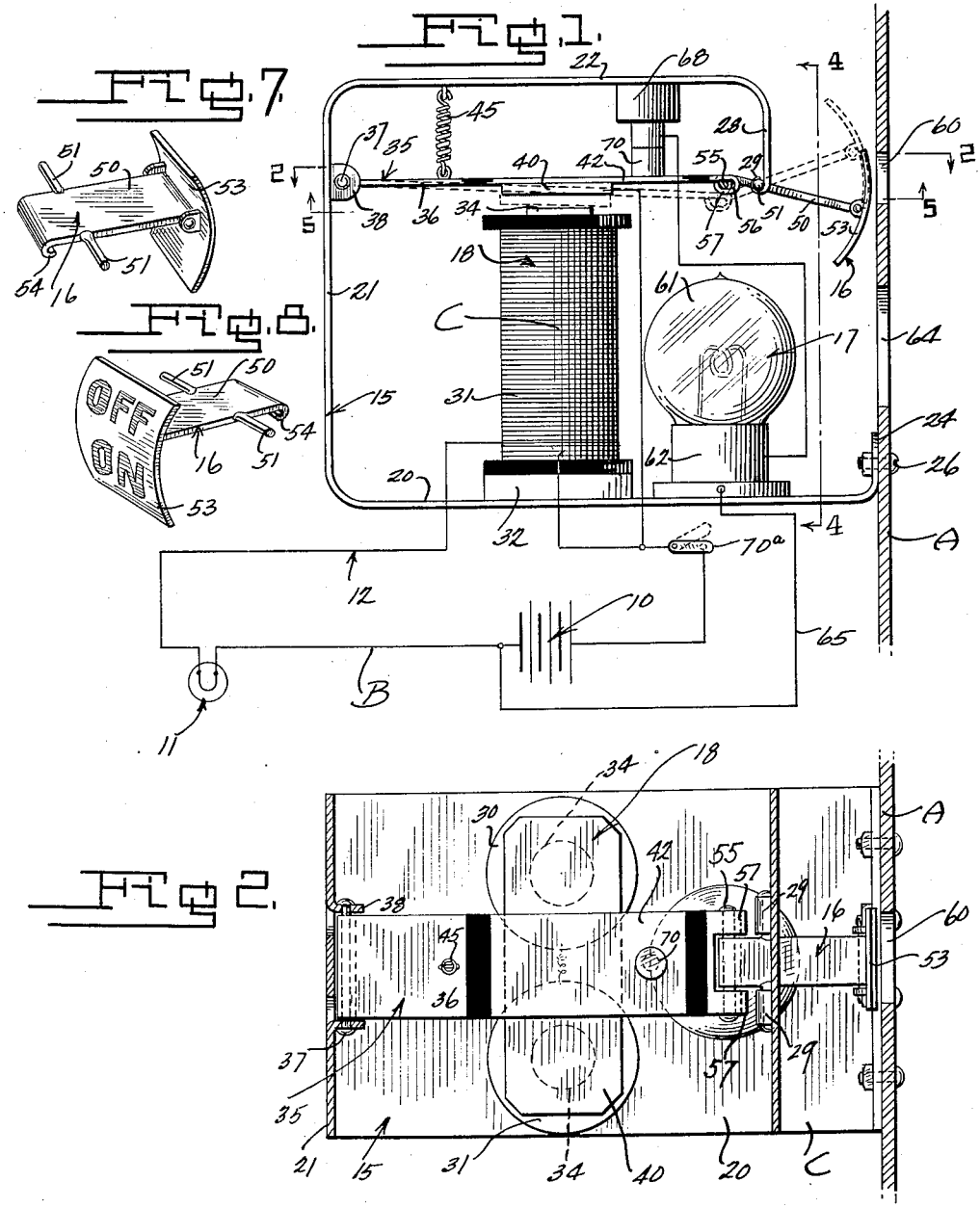
Inventor  
Wayne L. Furman Dec. 28, 1926.
W. L. FURMAN
1,612,504
SIGNALING DEVICE FOR GIVING WARNING OF DEFECTIVE ELECTRIC APPARATUS
Filed Jan. 13, 1923     2 Sheets-Sheet 2
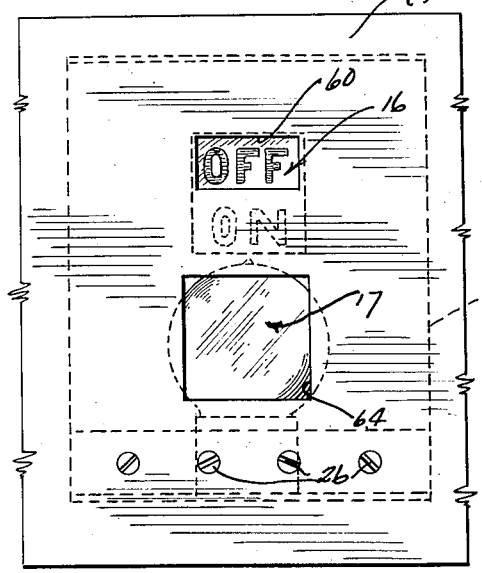
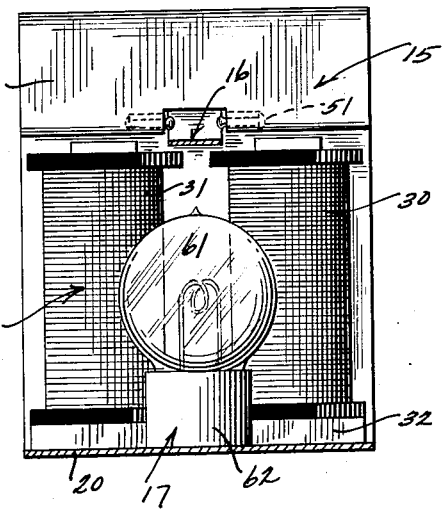
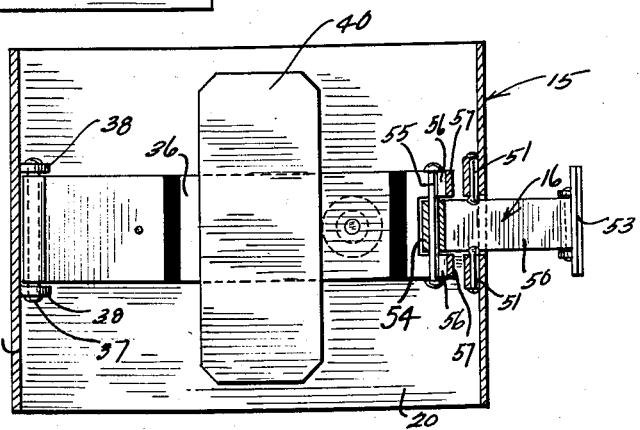
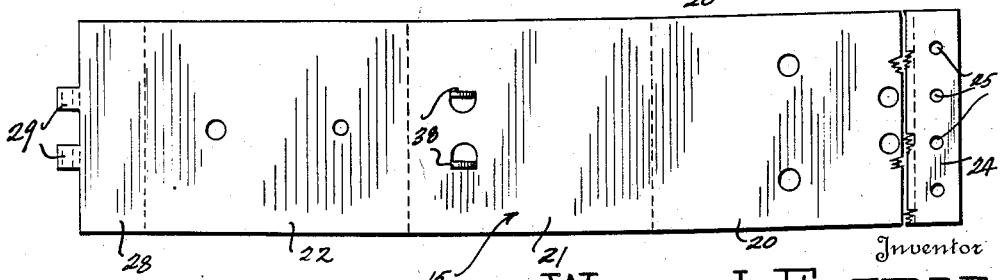
Inventor
Wayne L. Furman
By Lancaster and Allwine
Attorneys Patented Dec. 28, 1926.

1,612,504

UNITED STATES PATENT OFFICE.

WAYNE L. FURMAN, OF WELLSBORO, PENNSYLVANIA.

SIGNALING DEVICE FOR GIVING WARNING OF DEFECTIVE ELECTRIC APPARATUS.

Application filed January 13, 1923. Serial No. 612,557.

This invention relates to an improved signaling system for use upon automotive vehicles to give warning of defective operation of certain electrical apparatus, such as a circuit, tail light, head light, or the like.

The primary object of this invention is the provision of an indicating apparatus for giving warning of defective electrical appliances, such as tail lights, head lights, or the like, automatically operable by failure of an electric circuit through such appliance, to give warning to an operator in the most effective manner.

A further object of this invention is the provision of signaling apparatus of the above mentioned character which embodies a plurality of indicator devices, such as a movable indicator member, and a luminous indicator member, which are automatically operable upon failure of an electric circuit or essential electric appliance, so that an operator will positively be given warning of such defect.

A further object of this invention is the provision of signaling apparatus, for giving warning of defects in essential electric circuits or electrical appliances, which is adapted for specific use in connection with automotive vehicles, and may be compactly assembled for mounting upon the dash or instrument board of the vehicle where the same is visibly accessible to the operator of the vehicle.

Other objects and advantages of this invention will be apparent during the course of the following detailed description.

In the drawings, wherein similar reference characters designate corresponding parts throughout the several views.

Figure 1 is a side elevation of the improved details of the improved signal apparatus, showing diagrammatically the electrical circuit in which the same is placed, and showing the location of the same upon a support, such as an instrument board.

Figure 2 is a cross sectional view, taken substantially on the line 2—2 of Figure 1.

Figure 3 is a front elevation of the improved device.

Figure 4 is a cross sectional view, taken substantially on the line 4—4 of Figure 1.

Figure 5 is a cross sectional view, taken substantially on the line 5—5 of Figure 1.

Figure 6 is a fragmentary plan view of a novel supporting frame used for compact assemblage of the details of this invention, showing the same in its developed form.

Figures 7 and 8 are perspective views of a movable indicator element used in connection with the improved signaling device.

In the drawings, wherein for the purpose of illustration is shown but the preferred embodiment of this invention, the letter A generally may designate a supporting member such as a dash or instrument board of a vehicle; B, part of an ordinary electrical circuit for the vehicle which may include a storage battery 10, tail lamp or head lamp 11, and wiring 12; and C, the improved device for quickly and effectively signaling and giving warning of a defect in the circuit B, such as failure of the lamp 11, and which device may include the supporting frame 15, movable indicating member 16, luminous indicator 17, and electro-magnetic controlled means operatively connected in the circuit B.

Referring to the improved device C, the frame 15 thereof is preferably of sheet metal of a single strip of uniform width, bent into substantially U-shaped formation and providing a bottom supporting wall 20; a vertical rear wall 21; and a top wall 22. The bottom 20 is relatively longer than the top 22 and has the forward end 24 thereof upturned, and provided with a series of openings 25 therein, adapted to receive a plurality of detachable attaching elements 26, whereby the device may be suitably attached to the instrument board or supporting member A, so that the bottom 20 extends substantially horizontal. The forward end portion 28 of the frame top wall 22 is bent downwardly, substantially in a plane at right angles to the plane of said top 22, and is provided with the coiled lugs 29 on the depending edge thereof, which provide apertures in aligning relation for pivotally receiving the indicator member 16, as will be subsequently described.

The electromagnetic control means 18 preferably includes a pair of electromagnets 30 and 31, mounted upon a support 32, and carried by the bottom 20 of the supporting frame 15 and insulated therefrom. These electromagnets 30 and 31 are connected by the wires 12 in series with the lamp appliance 11, and receive magnetism from the storage battery 10. They provide contacts 34 at the upper ends thereof. An armature 35 is provided for the electromagnets 30 and 31, which includes an arm 36, pivoted as by a pin 37 to outstanding ears 38, which are struck from the vertical wall 21 of the supporting frame 15, so that the arm 36 extends transversely of the wall 21 and supports the transverse contact member 40 thereon, for cooperation with the contacts 34 of the electromagnets. That portion 42 of the armature upon which the contact 40 is mounted, is insulated from the remainder of the arm 36. A spiral spring 45 may be provided, connected at one end to the arm 36, and at its other end to the top 22 of the supporting frame 15, and which normally maintains the armature out of contacting relation with the electromagnet; said spring 45 being of such resiliency as to permit the attraction of the armature upon magnetization of the electromagnets 30 and 31.

Referring to the movable indicator 16, the same is of novel construction, including a plate 50 providing the aligning stem portions 51 upon the opposite side edges thereof which are adapted for pivotal reception in the curled lug portions 29 of the frame portion 28. At its end adjacent the dash A, the plate 50 of the indicator member 16 carries a concavo-convex or arcuate head 53, which upon the upper portion thereof is provided with the indicia "Off," and below the same the indicia "On." At its opposite end, the plate 50 is rolled, as at 54, for receiving a pin element 55; the ends of said pin element 55 extending laterally of the plate 50 for oscillative and slidable connection in the elongated slots 56, of curled ends 57, provided at the free end of the armature portion 36. From the curled end 54 to the axis of the stem 51 is relatively shorter than from the axis of said stems to the arcuate plate 53, which is struck from said axis as a center. An opening 60 is provided in the instrument board or dash A, through which the indicia on the forward surface of the indicator member 16 is visible, as will be subsequently described.

Referring to the luminous indicator means 16, the same preferably includes a lamp 61, which is detachably carried by a socket 62 upon the bottom 20 of the supporting frame 15, and forwardly of the dash or instrument board A, so that the said lamp 61 is visible through an opening 64 through said dash or instrument board. Wiring 65 is provided for the lamp 61, the wiring 65 forming a shunt circuit cut into the wiring 12 so that the circuit through the lamp 61 will not pass through the electric lamp 11 or electromagnets 30 and 31. In the wiring 65 of the lamp 61, a switch may be provided for operation by the armature 35, which may include a contact 68 carried by the top 22 of the supporting frame 15 and which may be insulated therefrom if desired; and a contact 70 carried by the arm 36, upon the portion 42 insulated from the remainder of said arm.

In operation, when the electric circuit B of the vehicle is in perfect working condition and the lamp 11 and storage battery 10 are functioning properly, the electromagnets 30 and 31 will be magnetized, so that the armature 35 will be attracted. Under these circumstances, the word "On" of the indicator 16 will be visible to the operator of the vehicle through the opening 60, and the shunt circuit defined by the wiring 65 will be broken incident to the non-contacting position of the switch contacts 68 and 70. Should the filament of the lamp 11 break, or something happen which will not permit the effective working of the wire 12, as to cause the lamp 11 to go out, the electromagets 30 and 31 will become demagnetized. The spring 45 will draw the arm 35 upwardly. This will rock the indicator member 16 into the position substantially illustrated in Figure 1 of the drawings, and in which position the word "Off" will be visible to the operator through the opening 60, and inform him of the defects in the conventional electric circuit or the lamp 11. At the same time, the contacts 68 and 70 will engage and the lamp 61 will be illuminated, the rays of which will emanate through the opening 64 and inform the operator of the defects in the essential working parts of the vehicle signaling system.

From the foregoing description of this invention, it is obvious that a device has been provided, which will signal in case of defects in essential parts of electrical apparatus. The fact that movable and luminous indicator devices are provided in the improved device insures that the operator will be informed of the defects at night, as well as in the daytime. Control switches 70ª of any approved type, may be provided in the various circuits of the vehicle, and details of construction of the improved device, for controlling the various features thereof.

Various changes in the shape, size, and arrangement of parts may be made to the form of invention herein shown and described, without departing from the spirit of the invention or the scope of the claims.

I claim:

1. A signal for defective circuits comprising a U-shaped frame having upper and lower horizontal arms and a vertical bridge connecting said arms, the lower arm having its free end portion provided with a foot for connection with a support and the upper arm having a depending free end portion, an electromagnet mounted upon the lower arm, an armature pivotally connected with said bridge and extending above the magnet, a switch including a contact carried by said armature and a contact carried by the upper arm of the frame, a lamp socket, a conductor connecting said lamp socket with the switch contact, resilient means normally holding said armature in a raised position out of engagement with the magnet and with the contact carried by the armature in engagement with the contact carried by the upper arm of said frame, and an indicator including an arm pivotally mounted intermediate its length to the depending end portion of the upper arm of said frame and pivotally and slidably connected with said armature whereby the indicator may be adjusted when the armature is moved.

2. In a signaling device of the class described the combination of a sheet metal frame bent into substantially a U-shaped formation and comprising a bottom supporting wall, a vertical rear wall, and a top wall, the bottom wall being relatively longer than the top wall and having an upstanding attaching foot thereon and the top wall having a depending supporting end, an electromagnet supported by the bottom wall extending upwardly therefrom, an armature pivoted on the rear wall and extending towards the depending end of the top wall, an indicator arm pivotally mounted between its ends on the depending end of the top wall and having a slidable connection at one end thereof with the outer end of the armature, said armature between its ends having a contact for attraction by the electro-magnet, and spring means for normally urging the armature away from the electro-magnet.

WAYNE L. FURMAN.